US006247824B1

(12) United States Patent
Berke et al.

(10) Patent No.: US 6,247,824 B1
(45) Date of Patent: Jun. 19, 2001

(54) MIRROR SYSTEM

(76) Inventors: Joseph J. Berke, 3248 Interlaken, West Bloomfield, MI (US) 48323; Charles Michael, 5698 Firwood, Troy, MI (US) 48098

( * ) Notice: Subject to any disclaimer, the term of this patent is extended or adjusted under 35 U.S.C. 154(b) by 0 days.

(21) Appl. No.: 09/625,837

(22) Filed: Jul. 27, 2000

(51) Int. Cl.[7] .................................................. G02B 7/182
(52) U.S. Cl. .......................... 359/880; 2/209.14; 2/422; 2/424
(58) Field of Search ............................... 359/871, 872, 359/879, 880; 2/209.14, 422, 424, 425

(56) References Cited

U.S. PATENT DOCUMENTS

| 4,651,357 | * | 3/1987 | Gershoni | 2/422 |
| 4,798,454 | * | 1/1989 | Hyun | 351/50 |
| 5,432,960 | * | 7/1995 | Kraut | 2/422 |
| 5,917,667 | * | 6/1999 | Turner | 359/880 |
| 6,052,832 | * | 4/2000 | Crompton | 2/422 |

\* cited by examiner

*Primary Examiner*—Cassandra Spyrou
*Assistant Examiner*—Mark A. Robinson
(74) *Attorney, Agent, or Firm*—Chupa & Alberti P.C.

(57) ABSTRACT

A method and apparatus for providing the wearer of a typical safety helmet, face shield, or other headwear a mirror system that improves the wearer's awareness of the rear and side ambient environment. A display is provided to the wearer of a safety helmet that encompasses a reverse field of view and an extended side view of the surrounding environment. This system not only compensates for the limited peripheral view of the helmet but also extends the wearer's visual perception.

21 Claims, 4 Drawing Sheets

MIRROR SYSTEM

FIELD OF INVENTION

The present invention generally relates to a supplemental visual reference system and more particularly, to a system that displays to the wearer of a safety helmet or other head worn apparatus a reverse field of view of a portion of the surrounding environment which not only compensates for the limited peripheral view of the helmet but also adds to the wearer's visual perception and safety.

BACKGROUND OF THE INVENTION

An additional or extended field of view provided to the wearer of a face shield of a helmet will allow greater visual perception and control of the wearer's peripheral environment for safety and pleasure.

Presently, many varieties of commercial safety helmets, face shields, or other head worn coverings are available. All of the currently available types cause a reduction of peripheral vision when worn. Typical or conventional vehicles (i.e., motorcycles, snowmobiles, bicycles) that require the use of a helmet or face shield offer one or more attached mirrors to the vehicle itself, which only provide limited visual references. These vehicle-attached mirrors are quite limited and have major drawbacks. For example, the mirrors that are physically affixed to the vehicle require that the helmet wearer maintain a relatively straight forward-facing head and neck position to be able to utilize the reflected rear view images. These prior devices also force helmet wearers to turn their heads and/or alter their field of vision to view the surrounding area of the vehicle. As such, these prior devices force helmet wearers to frequently take their eyes off of the road to observe their surroundings, thereby undesirably increasing the risk of an accident.

Additionally, since the mirrors of the prior art maintain a fixed position upon the vehicle while it is operated, the visual images reflected in them are limited to the direct field of view behind the vehicle not necessarily the optimum field of view behind the helmet wearer's varying head position. This limited rear view image presentation is further reduced when the vehicle turns or traverses hills and valleys.

Further, fixed vehicle mirror positions return rear view images, which typically suffer from areas of omission, better known as blind spots. An additional drawback is that fixed vehicular mirrors are often on handlebars or parts of the vehicle that suffer the vibrational effects of traveling at high speeds. This can be further exaggerated by wind or other elemental influences against the backs of the mirror housings. These drawbacks can make the operation of a motorcycle, snowmobile, bicycle or other vehicle, while using an ordinary safety helmet or face shield, difficult, stressful, and unsafe.

Consequently, there is a need to provide the helmet wearer with an improved system to produce more useful, complete, and accurate rear and side view visual images. The Applicants' invention addresses these drawbacks and provides a method and an apparatus for providing a mirror system to the wearer of a safety helmet, which is capable of withstanding the rigors of use with a high-speed vehicle.

SUMMARY OF THE INVENTION

It is a first object of the present invention to provide a system that overcomes the limitations of the reduced field of view suffered by the wearing of a safety helmet, face shield, or other head worn device by providing extended rear and side view visual images to the user.

It is the second object of the present invention to provide a system that overcomes the shortcomings of using a fixed mirror system on any variety of vehicles that the helmet wearer may be operating. This is accomplished by providing an adjustable, aerodynamic mirror system that further comprises an integrated face shield for use with a typical safety helmet. The mirror system offers to the user an extended field of view to the rear and sides of the wearer. The system is for use in high-speed applications and will withstand the physical forces of wind, rain, snow, saltwater spray, or other environmental elements imposed upon it in use.

It is a third object of the present invention to provide a system to overcome the previously delineated drawbacks in the wearing of preexisting, commercially available safety helmets and face shields. This is accomplished by providing an adjustable, aerodynamic mirror system that, in one non-limiting embodiment, allows the system to be disposed in retrofit upon a typical face shield or upon the front surface of a non-shielded helmet.

According to a first aspect of the present invention, an integral mirror system and face shield assembly, which mounts to a typical or commercially available safety helmet is provided.

According to a second aspect of the present invention, an operator adjustable mirror system which may be retrofitted and mounted on any commercially available helmet or face shield is provided.

According to a third aspect of the present invention, a method for providing a mirror system to the wearer of any typical or commercially available helmet or face shield is provided.

These and other aspects, features, and embodiments of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
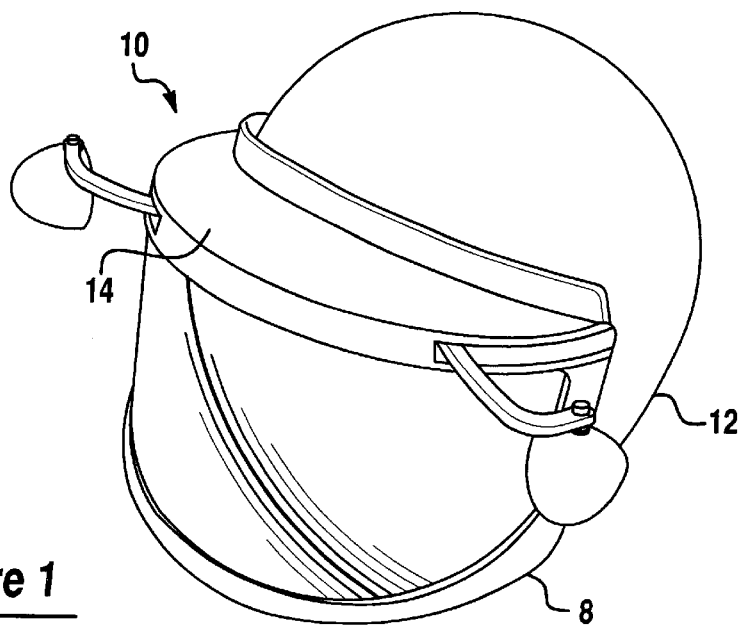
FIG. 1 is a perspective assembled view of a safety helmet incorporating a face shield with a mirror system that is made in accordance with the teachings of the preferred embodiment of the invention.
Figure 2:
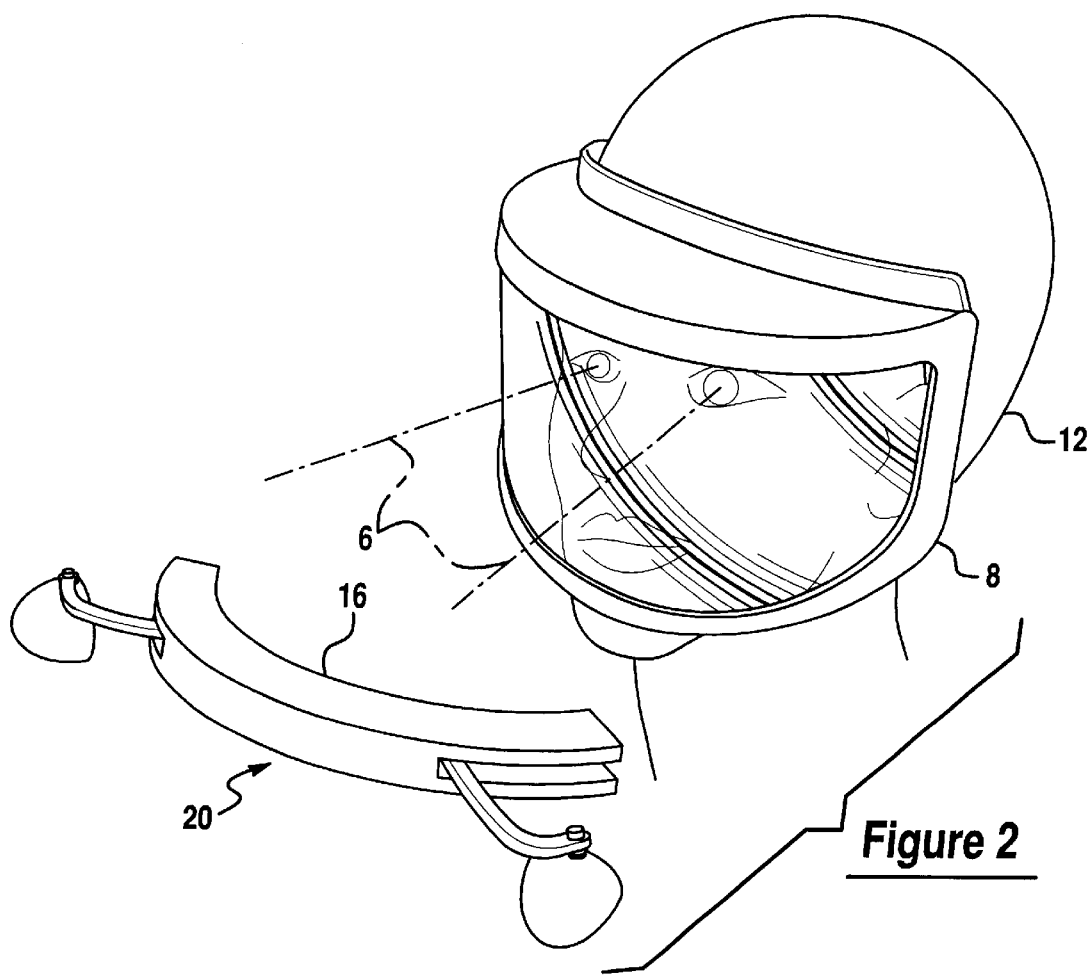
FIG. 2 is a perspective view of a retrofit mirror system as detached from a typical safety helmet face shield, as typically worn.
Figure 3:
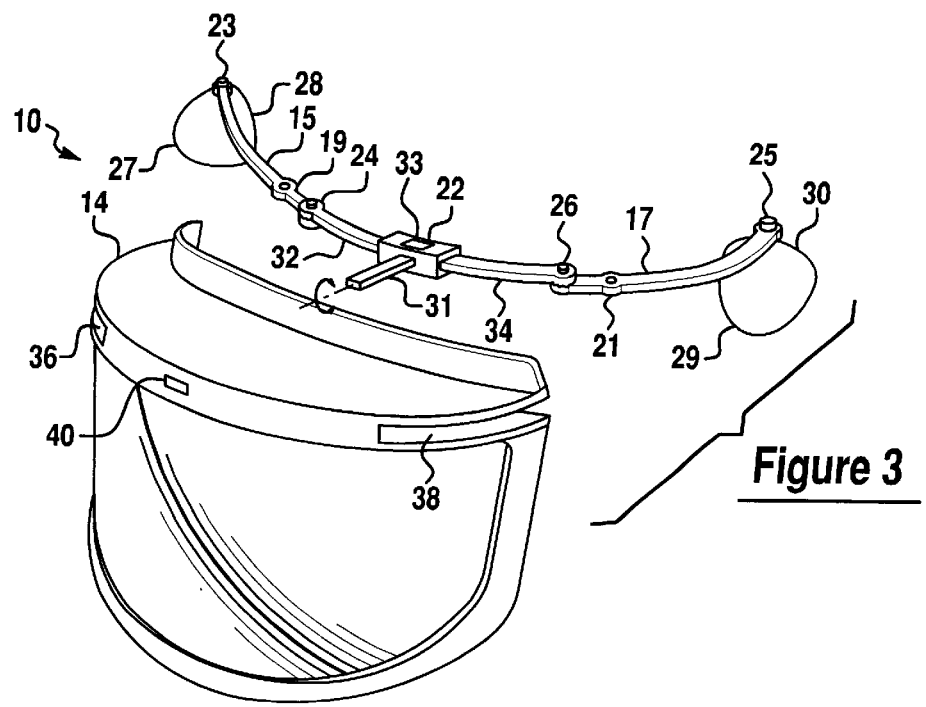
FIG. 3 is an unassembled view of a mirror system.
Figure 3A:
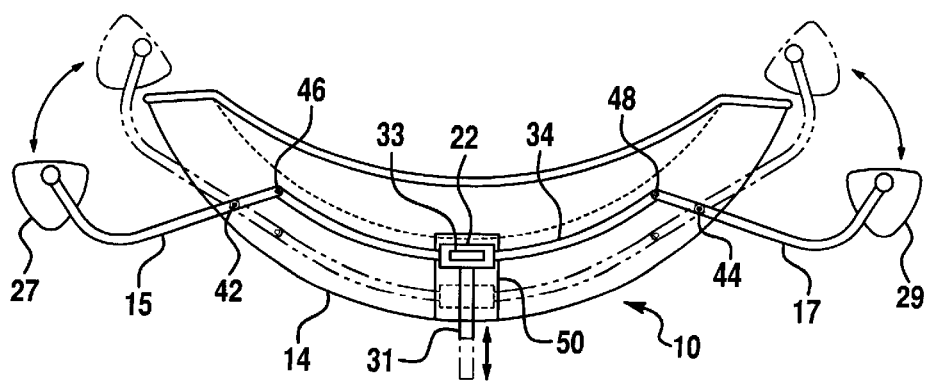
FIG. 3a is a top cross-section view of the integral mirror system and face shield.

Referring now to FIGS. 1 through 3, there is shown a mirror system 10 which is made in accordance with the teachings of the preferred embodiment of the invention. FIGS. 1 and 3 denote the preferred embodiment, which shows system 10 integrally disposed within the front of a safety helmet face shield 8 on the portion immediately above the wearer's forehead and forward field of view 6.

In a non-limiting embodiment, system 20 of FIG. 2 is a separate unit that may be retrofitted directly onto the surface of an existing helmet, face shield, or apparatus 8. It should be realized that the system 10 may be used with a variety of diverse helmets or other head worn apparatuses and that the present invention is not limited to the use of the safety helmet and face shield shown in FIGS. 1 and 2.

The main body 14 of the system 10 is aerodynamically streamlined and establishes the curved, horizontal front surface of face shield 8 and is operatively attached to a helmet 12. The main body 16 of system 20 is substantially similar in its internal construction and is aerodynamically constructed to follow the curved, horizontal front surface of a conventional helmet 12 or existing face shield 8. System 20 may be operatively attached directly to an existing face shield 8 or a safety helmet 12.

As shown in FIG. 3, the system 10 includes two substantially identical mirrors or reflective members 28 and 30 that are movably disposed on opposed sides of the device, contained in conically shaped, aerodynamic housings 27, 29. The preferred embodiment of the mirror surfaces 28 and 30 is that they be constructed with a mildly or substantially convex surface shape. In a non-limiting embodiment, the mirrors 28 and 30 may have a substantially flat planar shape, either of these embodiments provide a further extended visual image to the wearer in the periphery.

Each mirror housing 27, 29 is movable by being pivotally mounted to the ends of the extension arms 15, 17 by multi-planar attachment points 23, 25. The preferred embodiment of attachment points 23, 25 are ball and socket joints. In a non-limiting embodiment, attachment points 23, 25 may be formed with a typical spring loaded, locking ratchet type shaft, in which the user may pull downward on the mirror housing 27, 29 to adjust, then release the housing 27, 29 upward to engage the locking mechanism.

Any desired embodiment must be of sufficient strength and rigidity to withstand the aerodynamic forces placed on the mirror housings 27, 29 during high-speed use, yet allow the helmet wearer the ability to adjust each mirror housing 27, 29 to provide a substantially full and unobstructed view of the environment to the sides of and behind the wearer's head. As such, it is expected that the mirror system will be subjected to varied environments and conditions. The mirror housings 27, 29 are to be constructed and attached to the extension arms 15, 17 by conventional methods that provide the ability to withstand direct impact by a relatively heavy and sustained wind force. Environmental factors such as rain, snow, ice, saltwater, dirt, and mud will additionally require physical design considerations.

The extension arms 15, 17 position the mirror assemblies 27, 28 and 29, 30 outward and forward from the safety helmet 12, above and forward of the wearer's eyes 6 to provide the wearer reflected images of the areas to the rear and side of the wearer. The view provided by the mirror system 10 is immediately accessible with a minimum of eye movement and is not limited to the relative position of the vehicle.

The extension arms 15, 17 have pivot bores 19, 21 located approximately midway along their length. The extension arms 15, 17 are thereby pivotally disposed in the main body 14 by pivot pins 42, 44 which are placed through the pivot bores 19, 21 (and disposed in the main body in a conventional manner). The pivotal attachment of the extension arms 15, 17 allows their selective movement in the horizontal plane through the slotted openings 36, 38 of the main body 14. This pivotal disposition of the extension arms 15, 17 also allows the wearer to fold the arms 15, 17 and mirror assemblies 27, 28 and 29, 30 back against the sides of the helmet 12 for stowage.

The extension arms 15, 17 are further attached to the inner arms 32, 34. The inner arms 32, 34 are basically rectangular in cross-section formed in a curved lateral shape similar to the curve of the front of the main body 14. The inner ends of the inner arms 32, 34 are mounted in the central anchoring block 22. The inner arms 32, 34 and the anchoring block 22 are slidably disposed within the main body 14 of the device. The inner ends of the inner arms 32, 34 are fixed within the anchoring block 22 in a conventional manner. By way of non-limiting example, the anchoring block 22 and the inner arms 32, 34 may be formed of a single unit, molded or otherwise fashioned from a single piece of plastic or other light-weight, rigid, and strong material.

Both the outer ends of the inner arms 32, 34 and the inner ends of the extension arms 15, 17 have corresponding bores which receive pins 46, 48, thereby creating pinned connection joints 24, 26 and pivotally connecting the inner arms 32, 34 to the extension arms 15, 17. Connection joint pins 46, 48 may be, by way of example but not limited to, press-fit pins.

The anchoring block 22, the attached inner arms 32, 34, and the inner portions of the pivotally connected extension arms 15, 17 (up to the pivot points 19, 21) are disposed within a receiving cavity 50 formed in the back of the main body 14. Anchoring block 22 has a forward facing tab 31 that extends through an opening 40 in the main body 14. Forward and backward movement of tab 31 by a physical manipulation of the wearer causes anchoring block 22 and inner arms 32, 34 to slide forward or backward in cavity 50 thereby pivoting the extension arms 15, 17 about the pivot points 19, 21. This in turn extends or retracts the extension arms 15, 17 and mirror assemblies 27, 28 and 29, 30. With the extension arms 15, 17 in their full outward extended position, the wearer may adjust the mirror assemblies 27, 28 and 29, 30 to provide the optimum image presentation.

In a non-limiting embodiment, the anchoring block 22 and/or the tab 31 may further comprise a physical locking or engagement mechanism that would selectively retain the system 10 in the extended position thereby preventing unwanted retraction of the mirror assemblies 27, 28 and 29, 30 during use. For example and without limitation, anchoring block 22 may further comprise a wedge 33 which is rotationally attached to tab 31, whereby rotating tab 31 is effective to cause wedge 33 to raise and lower within anchoring block 22 sufficient to substantially "lock" the extension arms 32, 34 in place.

Figure 4:
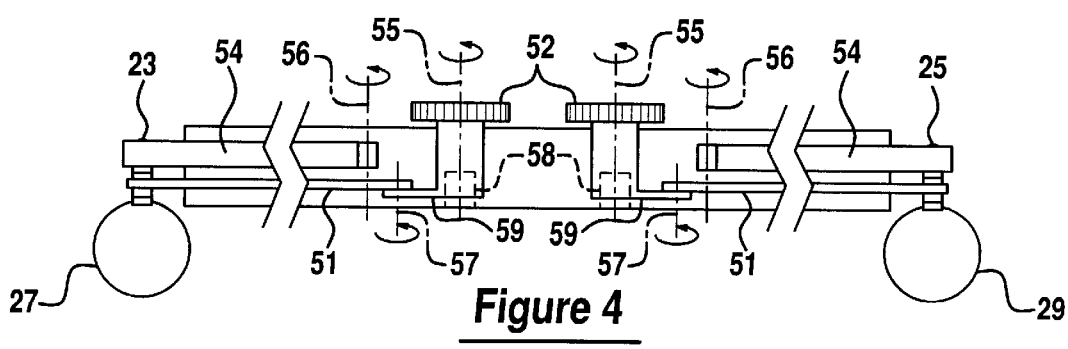
FIG. 4 is a front cross-section view of a mirror system depicting the embodiment of centrally located eccentric extension knobs that independently extend the mirrors.
Figure 4A:
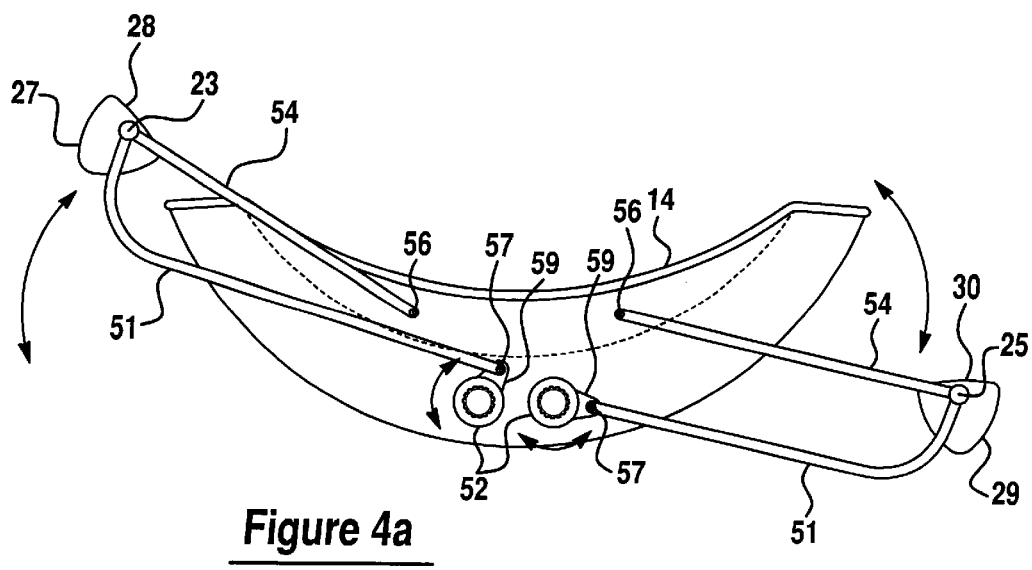
FIG. 4a is a top cross-section view of an embodiment of the integral mirror system and face shield utilizing the eccentric adjustment knobs of FIG. 4.

In a non-limiting embodiment of the present invention, FIGS. 4 and 4a depict a mirror system 10 that utilizes eccentric extension knobs 52, centrally mounted in the main body 14 to independently extend the mirror assemblies 27, 28 and 29, 30 through the use of a secondary set of extension arms 51. The secondary set of extension arms 51 are located underneath the primary extension arms 54 and are moved in and out by the rotational movement of the eccentric knobs 52 about their axis 55. Particularly, the inner ends of the secondary extension arms 51 are pivotally connected to the eccentric extension 59 of the eccentric knobs 52 by pins 57 and are further attached at their outer ends to the mirror housing joints 23, 25. Primary extension arms 54 are pivotally mounted on their inner ends by pins 56 and further attached at their outer ends to the mirror housing joints 23, 25. Extension knobs 52 may further comprise a physical locking or engagement mechanism that would selectively retain the system 10 in the extended position thereby preventing unwanted retraction of the mirror assemblies 27, 28 and 29, 30 during use. For example, and without limitation, extension knobs 52 are disposed on ratchet members 58 which are effective to substantially "lock" extension arms 51 in place. In this non-limiting example, extension knobs 52 must be raised or "pulled up" above the ratchet members 58 prior to selectively positioning extension arms 51.

Figure 5:
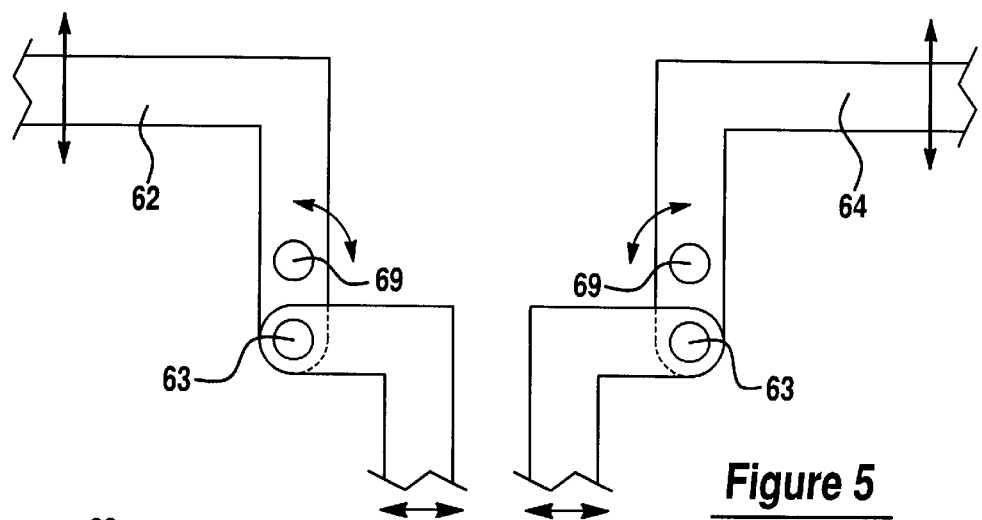
FIG. 5 is a top detail view of the embodiment of lateral sliding extension arms used in extending the system mirrors.
Figure 5A:
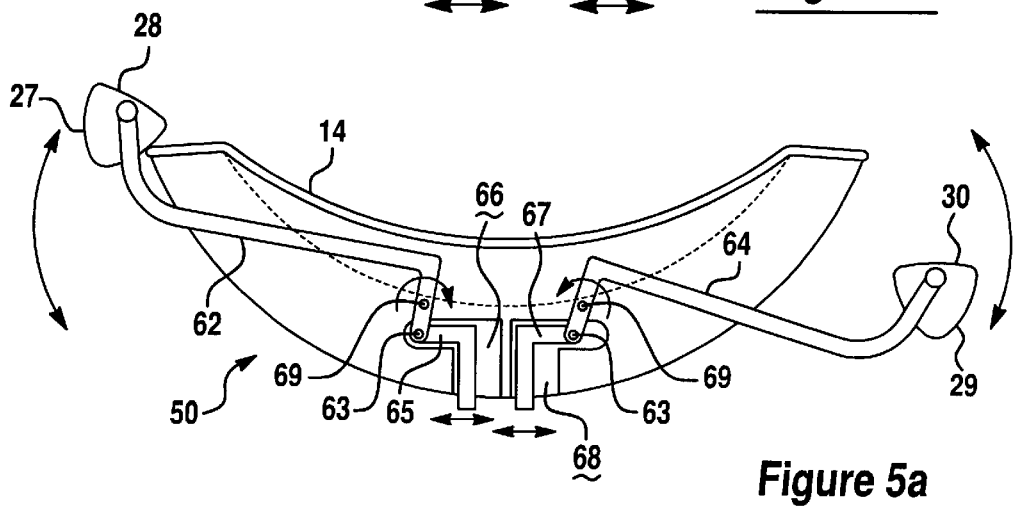
FIG. 5a is a top cross-sectional view of the embodiment utilizing lateral sliding arms used in extending the system mirrors.

In another non-limiting embodiment, FIGS. 5 and 5*a* depict a mirror system 50 that utilizes sliding extension tabs 65, 67 to independently extend the mirror assemblies 27, 28 and 29, 30. Sliding extension tabs 65, 67 are slidably disposed within channels 66, 68 that are contained within the main body 14 of system 50. Sliding extension tabs 65, 67 are "L" shaped and are pivotally connected to the extension arms 62, 64 on the end of the shorter "leg" of their "L" shape by a pivot pin 63. Extension arms 62, 64 are substantially similar to the extension arms 15, 17 previously discussed, however, extension arms 62, 64 also have an "L" shaped inner end on which a pivot point 69 is disposed. Extension arms 62, 64 are further fixedly disposed about pivot points 69 within the main body 14 in a conventional manner. Extension arms 62, 64 may thereby rotate about pivot points 69 within the internal confines of the main body.

As the sliding tabs 65, 67 are moved horizontally left and right within the main body channels 66, 68 the pivotal attachment points 63 act upon the ends of the extension arms 62, 64 causing them to rotate about the pivot points 69. This allows the extension arms 62, 64 and their associated mirror assemblies 27, 28 and 29, 30 to extend or retract. Selectively moving the extension tabs inwardly toward the centerline of the main body 14 allows the mirror assemblies 27, 28 and 29, 30 to be extended outward. As previously mentioned in the other non-limiting embodiments, the sliding tabs 65, 68 may further comprise a physical locking or engagement mechanism that would selectively retain the system in the extended position thereby preventing unwanted retraction of the mirror assemblies 27, 28 and 29, 30 during use.

Figure 6:
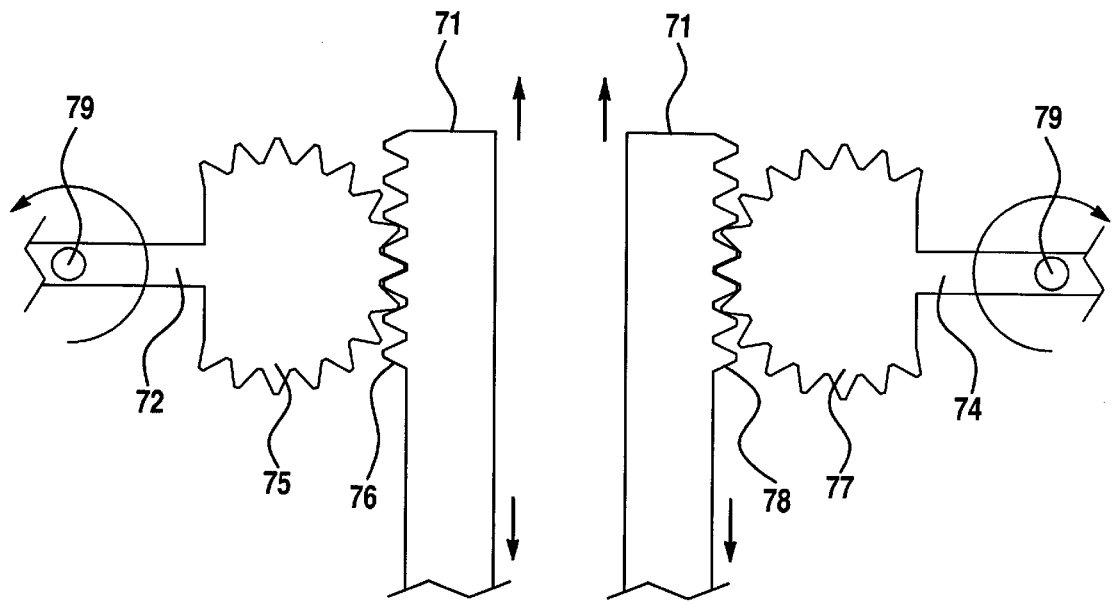
FIG. 6 is a top detail view of the embodiment of gear driven extension arms used in extending the system mirrors.
Figure 6A:
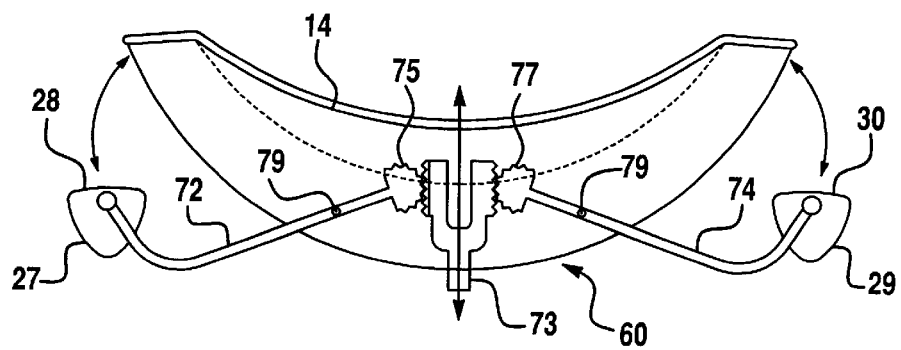
FIG. 6a is a top cross-sectional view of the embodiment utilizing gear driven extension arms used in extending the system mirrors.

In another alternative embodiment of the invention, FIGS. 6 and 6*a* depict a mirror system 60 that utilizes a gear extension tab 71 or 73 to extend the mirror assemblies 27, 28 and 29, 30. The gear extension tabs 71 of FIG. 6 differ from gear extension tab 73 of FIG. 6*a* only in the fact that they may be either formed into a single piece as tab 73 (in FIG. 6*a*) or remain separate as two independently operated extension tabs 71.

Gear extension tabs 71 or 73 are slidably disposed within the main body 14 of system 60. Extension arms 72, 74 are substantially similar to the extension arms 15, 17 previously discussed, however, extension arms 72, 74 also have a flat spur gear shaped profile on their inner ends 75, 77. Pivot points 79 are located within the extension arms 72, 74 relatively close to the gear shaped ends 75, 77. Extension arms 72, 74 are further fixedly disposed about pivot points 79 within the main body 14 in a conventional manner. Extension arms 72, 74 may thereby rotate about pivot points 79 within the confines of the main body 14.

As the gear extension tabs 71 or 73 are moved forward or backward, in and out of the main body 14, the gear tooth rack areas 76, 78 act upon the gear shaped ends 75, 77 of the extension arms 72, 74 causing them to rotate about the pivot points 79. This allows the extension arms 72, 74 and their associated mirror assemblies 27, 28 and 29, 30 to extend or retract. Selectively moving the gear extension tabs inwardly in the main body 14, toward the helmet, allows the mirror assemblies 27, 28 and 29, 30 to be extended outward. A forward pulling movement, away from the helmet, by the user on the gear extension tab 71 or 73 will cause the extension arms 72, 74 and their associated mirror assemblies 27, 28 and 29, 30 to be retracted. As previously mentioned in the other non-limiting embodiments, the gear extension tab 71 or 73 may further comprise a physical locking or engagement mechanism that would selectively retain the system in the extended position thereby preventing unwanted retraction of the mirror assemblies 27, 28 and 29, 30 during use.

It should be understood that this invention also encompasses a method for providing a mirror system 10 or 20 to a wearer of a safety helmet 12. The invention is additionally not to be limited to the exact construction or embodiment described above but that various changes may be made without departing from the spirit or scope of the invention.

What is claimed is:

1. A mirror system for use in combination with an apparatus worn on a head of an individual, said mirror system comprising:

a member which is adapted to be removably coupled to said apparatus;

at least one extension arm which is selectively and pivotally attached to said member and which is selectively movable between a retracted position in which said at least one extension arm is substantially contained within said member and an extended position in which said at least one extension arm projects from said member; and at least one mirror which is selectively and movably disposed upon an outer end of said at least one extension arm, said at least one mirror being effective to provide visual images to said individual of areas behind and substantially adjacent to said individual when said at least one extension arm is in said extended position.

2. The mirror system of claim 1 wherein said member comprises at least one integrally formed horizontally slotted portion in which said at least one extension arm selectively resides.

3. The mirror system of claim 1 wherein said at least one extension arm comprises a locking mechanism effective to hold said at least one mirror in said extended position.

4. The mirror system of claim 1 wherein said at least one extension arm comprises two extension arms and said at least one mirror comprises two mirrors.

5. The mirror system of claim 4 wherein each of said two mirrors are operatively disposed within a conical aerodynamically shaped housing.

6. The mirror system of claim 1 wherein said at least one mirror has a substantially convex shape.

7. The mirror system of claim 1 wherein said at least one mirror has a substantially flat planar shape.

8. A mirror system for use in combination with a safety helmet that provides visual images of areas to the rear and sides of a wearer comprising:

a member which is attached to said safety helmet;

an assembly disposed within said member;

two substantially identical extension arms that are selectively and movably disposed within said member and are selectively and movably attached to said assembly, said extension arms being selectively movable from a retracted position to an extended position; and two substantially identical mirrors that are individually, selectively, and movably disposed on said extension arms.

9. The mirror system of claim 8 wherein said member comprises at least one horizontally slotted portion in which at least one of said extension arms selectively and operatively travels.

10. The mirror system of claim 8 wherein said safety helmet comprises a face shield portion and wherein said member is attached to said face shield portion.

11. The mirror system of claim 8 wherein said assembly comprises an extended tab which protrudes through said member allowing said wearer to position said extension arms in either said retracted or said extended position.

12. The mirror system of claim 8 wherein said assembly comprises at least one knob extension member disposed within said member and which operatively and movably controls the selective positions of at least one of said extension arms.

13. The mirror system of claim 8 wherein said assembly comprises at least one slidable extension member disposed within said member which operatively and movably controls the selective positions of at least one of said extension arms.

14. The mirror system of claim 8 wherein said assembly comprises at least one gear driven extension member disposed within said member which operatively and movably controls the selective positions of at least one of said extension arms.

15. A method of providing a mirror system for headwear that provides visual images of areas to the rear and sides of an individual, said method comprising the steps of:

providing a pair of mirrors;

providing a pair of extension arms;

attaching said mirrors to said extension arms;

providing a member;

pivotally attaching said extension arms to said member;

selectively attaching said member to said headwear; and selectively moving said extension arms to an extended position, thereby providing said individual with said visual images.

16. The method of claim 15 further comprising the step of:

providing a locking mechanism which is effective to selectively hold said extension arms in said extended position.

17. The method of claim 15 wherein said headwear comprises a safety helmet.

18. The method of claim 15 wherein said headwear comprises a face shield portion.

19. The method of claim 15 further comprising the step of:

providing a gearing assembly, wherein said step of selectively moving said extension arms to an extended position is effected by said gearing assembly.

20. The method of claim 15 further comprising the step of:

providing a slidable assembly, wherein said step of selectively moving said extension arms to an extended position is effected by said slidable assembly.

21. The method of claim 15 further comprising the step of:

providing a knob assembly, wherein said step of selectively moving said extension arms to an extended position is effected by said knob assembly.

* * * * *